(12) United States Patent
Li et al.

(10) Patent No.: US 9,161,088 B2
(45) Date of Patent: Oct. 13, 2015

(54) METHOD IN A STREAMING CLIENT FOR HANDLING VIDEO STREAMING DATA, STREAMING CLIENT, COMPUTER PROGRAMS AND COMPUTER PROGRAM PRODUCTS

(75) Inventors: Jian Li, Adelaide (AU); Robert Feng, Shanghai (CN); Hongxia Long, Kunshan (CN); Mingkai Long, Shanghai (CN); Zhichun Ma, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/007,124

(22) PCT Filed: Mar. 25, 2011

(86) PCT No.: PCT/CN2011/000498
§ 371 (c)(1),
(2), (4) Date: Dec. 9, 2013

(87) PCT Pub. No.: WO2012/129716
PCT Pub. Date: Oct. 4, 2012

(65) Prior Publication Data
US 2014/0089996 A1   Mar. 27, 2014

(51) Int. Cl.
| | |
|---|---|
| *H04N 7/173* | (2011.01) |
| *H04N 21/472* | (2011.01) |
| *H04N 21/432* | (2011.01) |
| *H04N 21/433* | (2011.01) |
| *H04N 21/44* | (2011.01) |
| *H04N 21/845* | (2011.01) |
| *H04N 19/44* | (2014.01) |
| *H04N 19/423* | (2014.01) |

(52) U.S. Cl.
CPC ..... *H04N 21/47217* (2013.01); *H04N 21/4325* (2013.01); *H04N 21/4333* (2013.01); *H04N 21/44008* (2013.01); *H04N 21/47202* (2013.01); *H04N 21/8453* (2013.01); *H04N 19/423* (2014.11); *H04N 19/44* (2014.11)

(58) Field of Classification Search
None
See application file for complete search history.

(56) References Cited

U.S. PATENT DOCUMENTS 6,493,042 B1 * 12/2002 Bozdagi et al. ............... 348/700
6,757,485 B1   6/2004 Funakoshi (Continued)

FOREIGN PATENT DOCUMENTS

CN   1468002 A   1/2004
JP   H10257501 A   9/1998

OTHER PUBLICATIONS

Supplementary European Search Report issued on Apr. 30, 2015 in corresponding European Application No. EP 11862743, 5 pages.

*Primary Examiner* — Joshua Taylor
(74) *Attorney, Agent, or Firm* — Rothwell, Figg, Ernst & Manbeck, P.C.

(57) ABSTRACT

The invention relates to a method (10) in a streaming client (1) for handling video streaming data. The method (10) comprises: receiving (11), decoding (12) and buffering (13) video streaming data comprising frames of image data; displaying (14) the frames of image data on a display (40) of the streaming client (1); receiving (15) an input requesting a pause in the reception of video streaming data; selecting (16), among decoded frames of image data, an optimal frame of image data; continuing (17) displaying frames of image data available in a buffer (45) of the streaming client 1 until the selected optimal frame of image data is encountered; and displaying (18) the selected optimal frame of image data as a still picture on the display (40) of the streaming client (1). The invention also encompasses a streaming client (1), computer program (51) and computer program products (50).

13 Claims, 4 Drawing Sheets

(56) References Cited

U.S. PATENT DOCUMENTS

| | | | |
|---|---|---|---|
| 7,023,924 B1* | 4/2006 | Keller et al. | 375/240.26 |
| 8,438,484 B2* | 5/2013 | Gunatilake | 715/720 |
| 2002/0018146 A1 | 2/2002 | Matsubayashi | |
| 2002/0154822 A1 | 10/2002 | Nachtomy et al. | |
| 2008/0317138 A1 | 12/2008 | Jia | |
| 2010/0172549 A1* | 7/2010 | Weiss | 382/118 |

* cited by examiner

METHOD IN A STREAMING CLIENT FOR HANDLING VIDEO STREAMING DATA, STREAMING CLIENT, COMPUTER PROGRAMS AND COMPUTER PROGRAM PRODUCTS

CROSS-REFERENCE TO RELATED APPLICATION

This application is a 35 U.S.C. §371 National Phase Entry Application from PCT/CN2011/000498, filed Mar. 25, 2011, and designating the United States.

FIELD OF THE INVENTION

The invention relates generally to data streaming, and in particular to means and methods for handling video streaming data.

BACKGROUND OF THE INVENTION

Streaming of media content such as video and audio to end-users is a frequently used service provided by various service providers. There are various streaming clients, for example different media players, that are able to receive media content and display it on a screen for presentation to the user.

When the user pauses a streaming session, the streaming client will discontinue the streaming and the last decoded image is shown on the screen. After pausing, the last decoded image may be shown for quite a long time on the screen. Often, this last shown image is blurry. Such blurry pause image is most undesirable both from the user perspective as well as from the streaming client manufacturers' point of view. The user would naturally prefer a sharp still image to look at instead of an annoying blurry image, and the manufacturer of streaming clients would want to be able to provide their customers the best possible user experience.

SUMMARY OF THE INVENTION

It is clear that there is a room for improvement on this situation in this field of technology.

An object of the invention is to provide a sharp still image when pausing a video streaming session.

The object is according to a first aspect of the invention achieved by a method in a streaming client for handling video streaming data. The method comprises: receiving, decoding and buffering video streaming data comprising frames of image data; displaying the frames of image data on a display of the streaming client; receiving an input requesting a pause in the reception of video streaming data; selecting, among decoded frames of image data, an optimal frame of image data; continuing displaying frames of image data available in a buffer of the streaming client until the selected optimal frame of image data is encountered; and displaying the selected optimal frame of image data as a still picture on the display of the streaming client. The careful selection of a particular frame to be shown as a pause image during the pause provides an improved user experience compared to prior art. A sharp pause image is beneficial for the user as well as a manufacturer of the streaming client, as the typical user prefers looking at a sharp image rather than a blurry one, while the manufacturer of course wants to provide the best possible streaming client in a much competitive line of business.

In an embodiment, the step of selecting comprises the sub-steps of: determining a set of consecutive frames of image data as candidate images among which to select the optimal frame of image data; and selecting an optimal frame of image data within the determined set.

In a variation of the above embodiment, the set comprises frames of image data decoded during a specified time interval, the frames of image data being available in a buffer of the streaming client. This provides a proper range within which to select the best possible still image to be shown during the pause. The selection is thus made among the frames available in a buffer of the streaming client. That is, the method is efficient in that no separate high quality images, e.g. encoded in an encoder of the service provider with a higher resolution, are downloaded and used.

In an embodiment, the step of selecting comprises the sub-step of eliminating gradual change frames of image data as candidate images.

In an embodiment, the step of eliminating gradual change frames of image data comprises determining the contrast of the candidate images and eliminating gradual change frames of image data based thereon.

In a variation of the above embodiment, the contrast is determined by variance of a histogram. This is a convenient way of determining the contrast.

In an embodiment, the step of selecting comprises determining whether an I-frame is available in the set of consecutive frames of image data and selecting the I-frame as the optimal frame of image data if available.

In a variation of the above embodiment, the step of selecting comprises the sub-steps of: determining that no I-frame is available in the set of consecutive frames of image data; calculating cepstrum of all frames of image data in the set of consecutive frames of image data; and selecting the frame of image data having maximum cepstrum as the optimal frame of image data.

In a variation of the above embodiment, the cepstrum value for one frame of image data $g(x,y)$ is calculated as:

$$\operatorname{Cep}\{g(x,y)\}=F^{-1}\{\log|F\{g(x,y)\}|\}$$

wherein $F\{.\}$ is the Fourier Transform and $F^{-1}\{.\}$ is the inverse Fourier Transform.

In a variation of the above embodiment, the maximum cepstrum value of one frame of image data is calculated as the maximum value, $\operatorname{Cep}\{g(0,0)\}$, of a cepstrum matrix of the frame of image data.

In an embodiment, the step of selecting comprises the sub-steps of: determining that no I-frame is available in the set of consecutive frames of image data; calculating a ratio of high frequency and low frequency for all frames of image data in the set of consecutive frames of image data; selecting the frame of image data having maximum ratio as the optimal frame of image data.

In different variations, the streaming client comprises a mobile phone, a television, a laptop or a personal computer.

The object is according to a second aspect of the invention achieved by a streaming client comprising a controller, a display, an input and output interface and a computer program product comprising computer program code which, when executed by the controller, implements a pausing function, wherein: the controller is adapted to receive, decode and buffer video streaming data comprising frames of image data; the controller is adapted to render the video streaming data on the display of the streaming client; the controller is adapted to receive an input requesting a pause in the reception of video streaming data; the controller is adapted to select, among decoded frames of image data, an optimal frame of image data; the controller is adapted to continue displaying frames of image data available in a buffer of the streaming client until the selected optimal frame of image data is encountered; and the controller is adapted to display the selected optimal frame of image data as a still picture on the display of the streaming client.

The object is according to a third aspect of the invention achieved by a computer program for handling video streaming data, the computer program comprising computer program code which when run on a streaming client causes the streaming client to: receive, decode and buffer video streaming data comprising frames of image data; display the frames of image data on a display of the streaming client; receive an input requesting a pause in the reception of video streaming data; select, among decoded frames of image data, an optimal frame of image data; continue displaying frames of image data available in a buffer of the streaming client until the selected optimal frame of image data is encountered; and display the selected optimal frame of image data as a still picture on the display of the streaming client.

The object is according to a fourth aspect of the invention achieved by a computer program product comprising a computer program as above, and computer readable means on which the computer program is stored.

Further features and advantages thereof will become clear upon reading the following description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
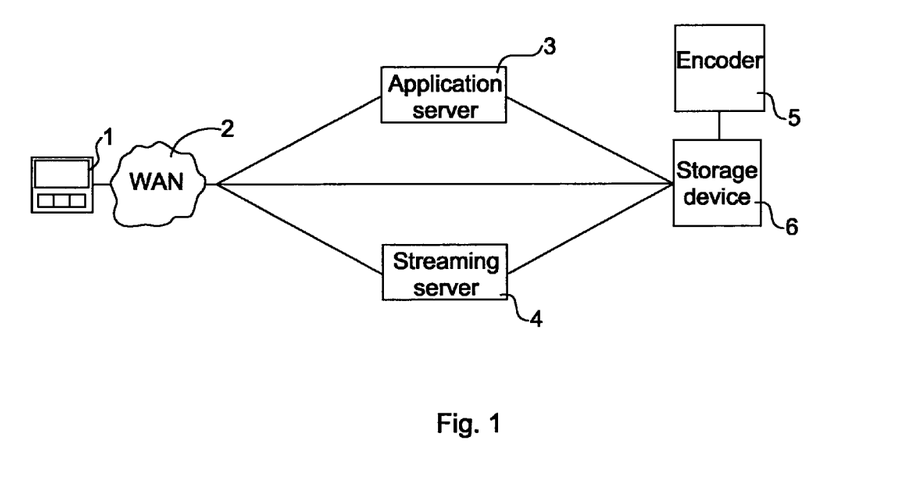
FIG. 1 illustrates schematically an environment in which embodiments of the invention may be implemented.

FIG. 1 illustrates schematically an environment in which embodiments of the invention may be implemented. A streaming client 1 able to receive streaming content, such as video and audio, is illustrated schematically at reference numeral 1. The streaming client 1 may for example comprise a media player (e.g. application software) in a laptop, a personal computer (PC) or a mobile phone. The streaming client 1 can thus receive streaming content and present the content for a user thereof. The streaming content comprises frames of image data, and in the following "frame" and "image" are used interchangeably, and intended to mean a particular frame of image data.

In the illustrated exemplifying environment, the streaming client 1 has access to a wide area network (WAN) 2, such as Internet. Such access can be provided over a wired or wireless network.

An application server 3 and a streaming server 4 are also connected to the wide area network 2. The streaming client 1 can thereby communicate with the application server 10 in order to e.g. control the streaming content from the streaming server 4. For example, the streaming client 1 may comprise a web browser to browse content, in particular content comprising both video and audio. The web browser communicates with a web server on the application server 3, and when the user of the streaming client 1 has decided what content to stream, the streaming client 1 sets up a session with the streaming server 4, e.g. using RTSP/RTP (Real Time Streaming Protocol/Real-time Transfer Protocol). RTSP can be used for sending control signals, such as SETUP, PLAY, PAUSE, TERMINATE, as is known in the art. RTP can be used to transfer the actual content to the streaming client 1.

A storage device 6 is connected to the application server 3, the streaming server 4 and an encoder 5. The storage device 6 is also connected to the WAN 2, optionally using an internal or external file server, e.g. a web server (e.g. the application server 3), file transfer protocol server and/or a streaming server (e.g. the streaming server 4). One or more directories of the storage device 6 can for example be mounted as a file systems on any or all of the application server 3, streaming server 4 and the encoder 5, using a remote mounting protocol such as Network File System (NFS), Apple Filing Protocol (AFP), Server Message Block (SMB)/Common Internet File system (CIFS), Web-based Distributed Authoring and Versioning (WebDAV) or File Transfer Protocol (FTP), to mention a few.

The storage device 6 stores streaming content. Streaming content files stored therein can for example comprise MPEG-4 (Moving Picture Experts Group 4) compliant files or MPEG-2 compliant files comprising both audio data and video data, or video/audio files of any other format.

The encoder 5 encodes the original content, such as high quality video/audio or broadcast content (cable, terrestrial or satellite), to a streaming content file.

The above is provided to exemplify an environment in which various aspects of the invention can be implemented.

Figure 2:
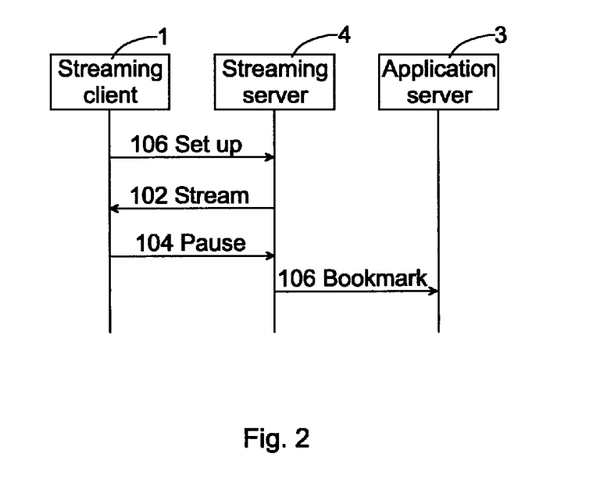
FIG. 2 is a sequence diagram illustrating pausing of a streaming session.

FIG. 2 is a sequence diagram illustrating an exemplary signaling for pausing of a streaming session. The streaming client 1 sends a request 100 to the streaming server 4 for a streaming session to be set up. The streaming server 4 then starts to stream 102 the requested content to the streaming client 1. The user of the streaming client 1 wants to pause the streaming session and presses a pause button, whereby the streaming client 1 sends a pause message 104 to the streaming server 4. Although not relevant for the present disclosure, the streaming server 4 may then create a bookmark for the timestamp when the pause message was received and sends 106 the bookmark to the application server 3. The present disclosure is mainly concerned with the streaming client 1 and methods therein when requesting a pause in the streaming session.

Figure 3:
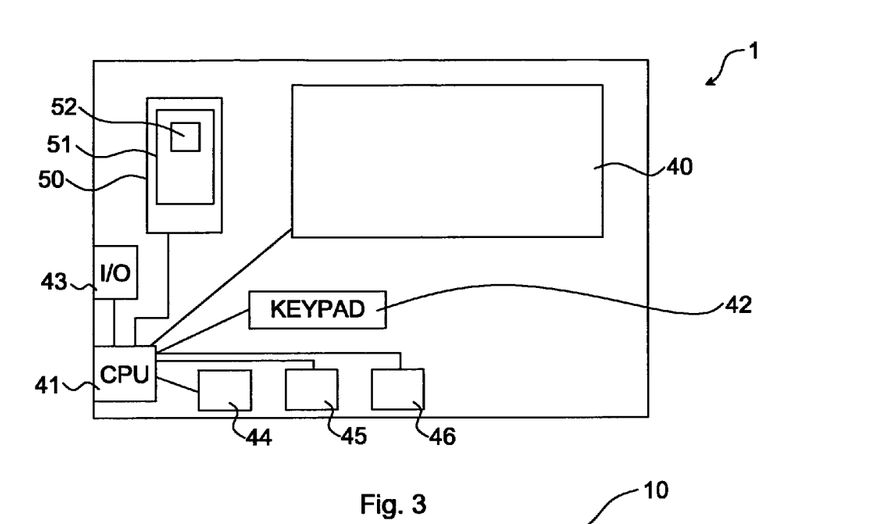
FIG. 3 illustrates schematically a streaming client in an embodiment of the invention.

In FIG. 3 an embodiment of the streaming client 1 is schematically illustrated. The streaming client 1 comprises user interface elements, such as a display 40 and a user input device such as a keypad 42. Although not illustrated, the streaming client 1 may comprise further user interface elements such as speakers or audio output for e.g. headphones.

The streaming client 1 further comprises a controller 41 capable of executing instructions e.g. stored in a memory 44. The memory 44 can thus be in the form of a computer program product comprising instructions for how the streaming client 1 is to implement the provision of a sharp still image when pausing the streaming session, and in particular a video streaming session.

The streaming client 1 further comprises an input/output interface 43 for communicating with the streaming server 4 over e.g. the WAN 2 using one or more wireless and/or wired communication protocols.

The streaming client 1 further comprises a decoder 46 for decoding received streaming content and a buffer 45 in which the received streaming content is stored after being decoded. The streaming content, i.e. consecutive frames of image data, in the following denoted frames or images, are then displayed sequentially on the display 40.

When the user of the streaming client 1 wants to pause the streaming session comprising streaming data in the form of frames, a method in accordance with the present invention is performed in the streaming client 1.

Figure 4:
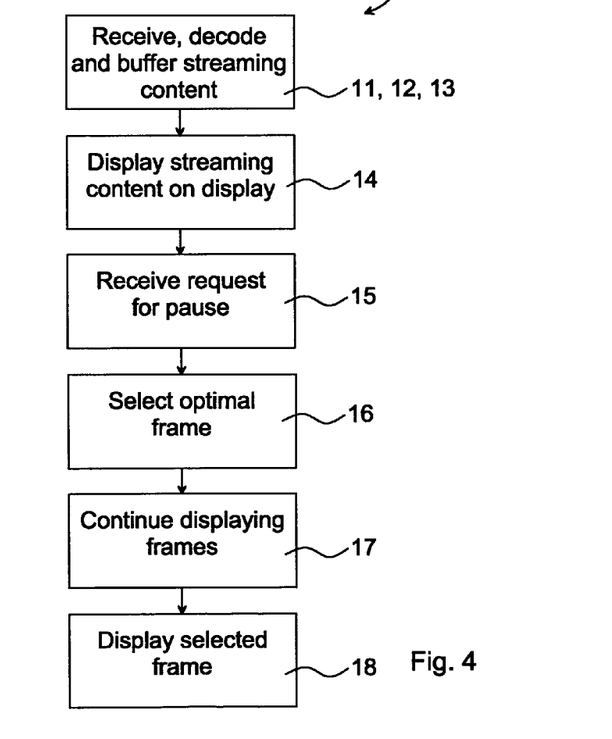
FIG. 4 illustrates a flow chart over steps of a method in a streaming client.

In FIG. 4 steps of a method 10 in the streaming client 1 for handling video streaming data are illustrated. The streaming client 1 receives media content (frames), decodes it in decoder 46 and then buffers it in the buffer 45. Typically, frames in the buffer 45 comprise those frames which are to be displayed next, while already displayed frames have been removed (deleted) from this buffer 45.

It is noted that the methods of the invention functions equally well irrespective of types of streaming mechanisms, such as traditional real time streaming, Iphone/Microsoft http streaming, Adobe http streaming etc. In some types of streaming, the streaming content is downloaded to e.g. a hard disk of the streaming client, and in this case already shown frames can be stored on the hard disk before deleted from the buffer 45.

The method 10 thus comprises the first steps of receiving 11, decoding 12 and buffering 13 video streaming data comprising frames.

The frames are displayed 14 on the display 40 of the streaming client 1 sequentially, i.e. in consecutive order corresponding to the order of reception.

When the user wishes to pause the streaming session, he or she may enter a command to this end e.g. by pressing a button of the keypad 42. The streaming client 1 thus receives 15 the input requesting a pause in the reception of video streaming data. An exemplary signaling for such pausing of the streaming session was described earlier with reference to the sequence diagram of FIG. 2.

In order to obtain a sharp still image to be shown during the pause, the streaming client 1 is arranged to select 16, among the decoded frames, an optimal frame. In contrast to prior art, wherein the last decoded frame is simply shown, a careful selection is made in accordance with the invention.

In accordance with the method 10, the streaming client 1 is arranged to continue 17 displaying frames of image data available in the buffer 45 of the streaming client 1 until the selected optimal frame of image data is encountered.

The selected optimal decoded frame of image data is then displayed 16 on the display of the streaming client 1.

The streaming client 1 is thus arranged to display frames from the buffer 45 until the selected optimal frame is reached. The streaming client 1 does not necessarily stop displaying frames immediately upon reception of the pause request, but can continue displaying images from the buffer until the selected image is displayed. The streaming client 1 measures a number of next already decoded frames, which are stored and available in the buffer 45. The streaming client 1 is arranged to find the optimal (e.g. clearest) image and continue displaying images until that image is displayed. Determining criteria for selecting the frame to be the "pause frame" are described next.

Figure 5:
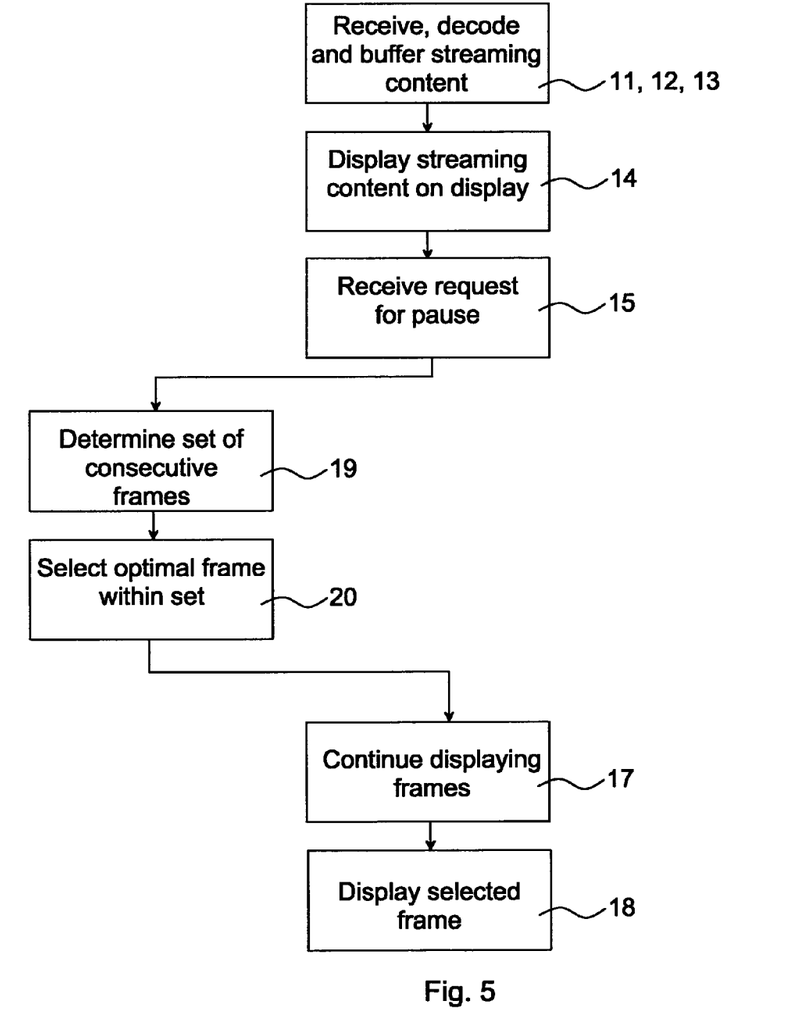
FIG. 5 illustrates a flow chart over steps of another embodiment of the method of FIG. 4.

In an embodiment, with reference to FIG. 5, the step of selecting 16 comprises a first sub-step of determining 19 a set of consecutive frames as candidate frames among which to select the optimal frame. In an embodiment, the set of consecutive frames comprises frames that have been decoded during a specified time interval. These frames should be available in the buffer 45 of the streaming client 1.

For example, the next frames of e.g. 2 seconds, retrieved from the buffer 45, can be such set of consecutive frames. The specified time interval may, but need not, comprise the time of the pausing request. That is, the time of the pausing request may lie within the specified time interval.

The step of selecting 16 then comprises a second sub-step of selecting 20 an optimal frame within the determined set of consecutive frames.

In an embodiment, the step of selecting 16, for example within the determined set of consecutive frames, comprises eliminating gradual change frames as candidate frames. This can for example be performed by determining the contrast of the candidate frames and eliminate gradual change frames based thereon. The contrast is for example determined by variance of a histogram.

In an embodiment of the invention, the step of selecting 16 comprises determining whether an I-frame (intra-coded frame) is available in the set of consecutive frames. If such I-frame is available, it is selected as the optimal frame and is displayed 18 as the pause still image on the display 40.

However, it may happen that a determination is made that no I-frame is available in the set of consecutive frames of image data. Then the cepstrum of all frames in the set of consecutive frames is calculated. Based on these calculations, the frame having maximum cepstrum is selected as the optimal frame.

The cepstrum value for one frame of image data g(x,y) is calculated as:

$$\mathrm{Cep}\{g(x,y)\}=F^{-1}\{\log|F\{g(x,y)\}|\}$$

wherein F{.} is the Fourier Transform and $F^{-1}${.} is the inverse Fourier Transform.

The maximum cepstrum value of one frame is calculated as the maximum value, Cep{g(0,0)}, of a cepstrum matrix of the frame.

In another embodiment, when a determination is made that no I-frame is available in the set of consecutive frames, a ratio of high frequency and low frequency for all frames in the set of consecutive frames is calculated. The frame having the maximum ratio is then selected as the optimal frame.

When the streaming client 1 receives the input requesting a pause, it continues displaying frames that are available in the buffer 45 of the streaming client 1 until the selected optimal frame is encountered. The selected optimal frame is then displayed as the still image.

The steps described above can be combined in different ways for obtaining a suitable selection of image to be shown during a pause. In the following a particular embodiment, comprising several of the above steps, is described.

When the pause message has been sent by the streaming client 1 and the streaming client 1 has stopped receiving video content, the following steps are performed:

The controller 41 determines a set of consecutive frames as candidate frames among which to select the optimal one. For example, it gets, from the buffer 45, the next images that have been decoded during a time period of 2 seconds. For example, in the buffer 45 there is during this 2 second time period, 50 frames f1, f2, f3, . . . , f50 that are possible candidates for the optimal frame.

The controller 41 then removes gradual change images from the set of candidates. This can be done for example by deleting the candidates having the worst contrast (the contrast may for example be calculated by variance of histogram). The set of candidates now comprises the following set of frames: f1, f2, [10 frames are deleted as candidates], f13, f14, . . . , f35, [10 frames are deleted as candidates], f46, . . . , f50. 30 frames thus remain in the set of candidate frames.

Next, the controller 41 gets the first I-frame, among the remaining candidates, as the optimal frame if at least one such I-frame exists. For example, if f14 is an I-frame, then f14 is selected as the optimal frame and is then used as the pause image.

If there is no I-frame available among the remaining 30 frames, then the controller 41 calculates the cepstrum for all these frames f1, f2, f13, f14, . . . , f35, f46, . . . , f50 and selects the frame having the maximum cepstrum value as the optimal frame. For example, if there is no I-frame among the remaining 30 frames, and f20 has the highest cepstrum, then f20 is selected as the optimal frame and is then used as the pause image.

With reference again to FIG. 3, the invention encompasses the streaming client 1 comprising the controller 41, the display 40, the input and output interface 43. The streaming client 1 further comprises a computer program product 50 comprising computer program code which, when executed by the controller 41, implements a pausing function as described above.

The controller 41 is thus adapted to receive 11, decode 12 and buffer 13 video streaming data comprising frames. To this end, the controller 41 interacts with the input/output interface 43, the decoder 46 and the buffer 45, respectively.

The controller 41 is further adapted to render the video streaming data to be shown on the display 40 of the streaming client 1, and to receive 14 an input requesting a pause in the reception of video streaming data. The controller 41 thus interacts with the display 40 and receives e.g. from the keypad 42 a user input requesting pause and acts thereon. In particular, upon receipt of the pause request, the streaming client 1, and in particular the controller 41 and the input/output interface 43 in cooperation, sends a pause message to the streaming server 4 as was described earlier.

The controller 41 is adapted to select, among decoded frames of image data, an optimal frame. To this end, the controller 41 may execute computer program code.

The controller 41 is adapted to continue 17 displaying frames of image data available in the buffer 45 of the streaming client 1 until the selected optimal frame of image data is encountered.

Finally, the controller 41 is adapted to display 18 the selected optimal decoded frame of image data as a still picture on the display 40 of the streaming client 1, which can be done in conventional manner.

The controller 41 may comprise a central processing unit (CPU), microcontroller, and/or digital signal processor (DSP). The controller 41 is capable of executing software instructions stored in a computer program product 50.

With reference again to FIG. 3, the invention also encompasses a computer program 51 for handling video streaming data. The computer program 51 comprising computer program code which when run on the streaming client 1, and in particular the controller 41 thereof, causes the streaming client 1 to perform the methods as described earlier.

A computer program product 50 is also provided comprising the computer program 51 and computer readable means 52 on which the computer program 51 is stored. The computer program product 50 can be any combination of read and write memory (RAM) or read only memory (ROM). The computer program product 50 may also comprises persistent storage, which, for example can be any single one or combination of magnetic memory, optical memory, or solid state memory.

Figure 6:
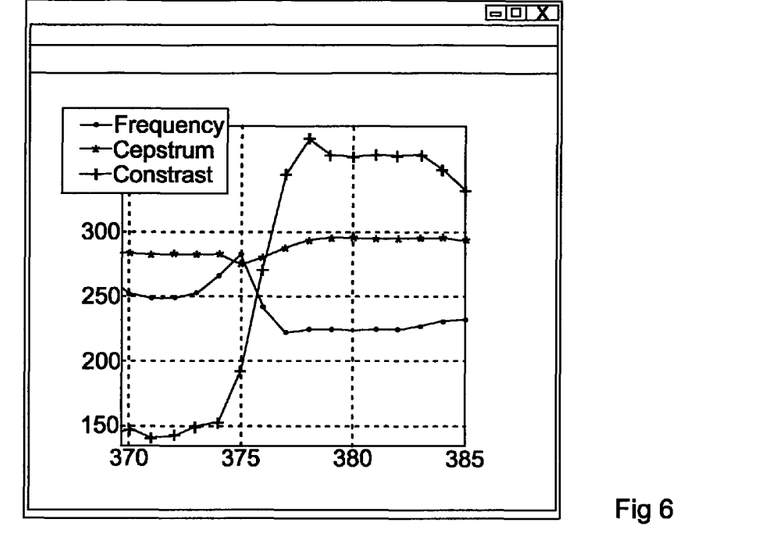
FIG. 6 illustrates graphs over relevant parameters when selecting a pause image of a simulation made.

The method as described was tested in a simulation for 700 frames. FIG. 6 illustrates graphs over relevant parameters when selecting a pause image of the simulation made. In particular, a pause request is made in frame 373. From the graphs, it can be seen that frame 375 is better when looking at the frequency. However, it can be seen that the frame 375 is a frame in a gradual change scene, and it has no good value in cepstrum. Therefore a frame may be selected that is before the frames of the gradual change scene starts. Frame 374 is a little better (has slightly higher cepstrum) than frame 373 and occurs before the gradual change scene, which starts with frame 375. Thus frame 374 is selected as the optimal frame and is displayed on the display of the streaming client 1.

Figure 7:
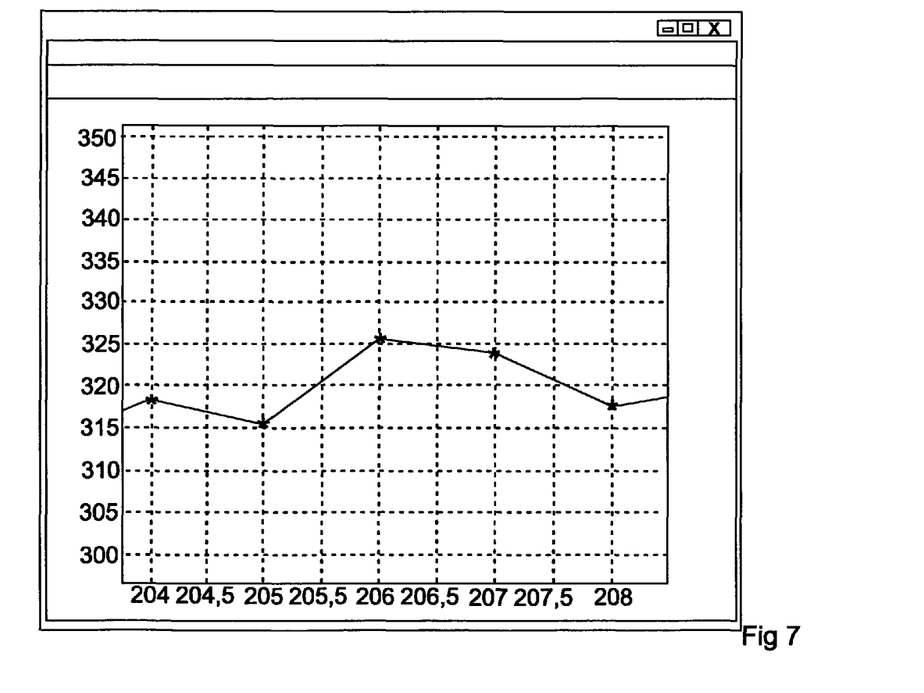
FIG. 7 illustrates a graph over cepstrum for different frames.

FIG. 7 illustrates a graph over cepstrum for different frames. For motion images, for example, it was seen that the frame having the highest cepstrum value was the most clear image.

The teachings of the present patent application can be implemented for different applications. To mention a few examples, the methods described can be implemented when streaming a video on demand on a mobile phone, e.g. in mobile TV system, or in Internet Protocol television (IPTV), or when streaming a video on demand from Internet on a personal computer.

The invention claimed is:

1. A method in a streaming client for handling video streaming data, the method comprising:
   receiving, at the streaming client, video streaming data comprising frames of image data,
   decoding, at the streaming client, the received frames of image data, thereby producing decoded frames of image data at the streaming client,
   buffering the decoded frames of image data in a video frame buffer of the streaming client,
   receiving, at the streaming client, an input requesting a pause in the reception of video streaming data,
   the streaming client selecting an optimal decoded frame of image data from a set of two or more of said decoded frames of image data stored in the video frame buffer,
   displaying decoded frames of image data available in a buffer of the streaming client until the selected optimal decoded frame of image data is encountered, and
   displaying the selected optimal decoded frame of image data as a still picture on the display of the streaming client, wherein the step of selecting the optimal decoded frame of image data comprises:
   determining a set of consecutive frames of image data as candidate images among which to select the optimal decoded frame of image data,
   determining that no I-frame is available in the set of consecutive frames of image data,
   calculating cepstrum of all frames of image data in the set of consecutive frames of image data,
   selecting the frame of image data having maximum cepstrum as the optimal frame of image data.

2. The method as claimed in claim 1, wherein the set comprises frames of image data decoded during a specified time interval, the frames of image data being available in a buffer of the streaming client.

3. The method as claimed in claim 1, wherein the step of selecting comprises the sub-step of eliminating gradual change frames of image data as candidate images.

4. The method as claimed in claim 3, wherein the step of eliminating gradual change frames of image data comprises determining the contrast of the candidate frames of image data and eliminating gradual change frames of image data based thereon.

5. The method as claimed in claim 4, wherein the contrast is determined by variance of a histogram.

6. The method as claimed in claim 1, wherein a cepstrum value for one frame of image data g(x, y) is calculated as:

$$Cep\{g(x,y)\}=F^{-1}\{\log|F\{g(x,y)\}|\}$$

wherein $F\{.\}$ is the Fourier Transform and $F^{-1}\{.\}$ is the inverse Fourier Transform.

7. The method as claimed in claim 6, wherein the maximum cepstrum value of one frame of image data is calculated as the maximum value, $Cep\{g(0,0)\}$, of a cepstrum matrix of the frame of image data.

8. The method as claimed in claim 1, wherein the streaming client comprises a mobile phone, a television, a laptop or a personal computer.

9. The method as claimed in claim 1, wherein the video streaming data is On Demand video streaming data.

10. A streaming client comprising a controller, a display, an input and output interface and a computer program product comprising computer program code which, when executed by the controller, implements a pausing function, wherein:
the controller is adapted to receive video streaming data transmitted by a video streaming server, the video streaming data comprising frames of image data,
the controller is adapted to decode and buffer the received frames of image data,
the controller is adapted to display the video streaming data on the display of the streaming client,
the controller is adapted to receive an input requesting a pause in the reception of video streaming data,
the controller is adapted to select, among decoded frames of image data, an optimal frame of image data, and
the controller is adapted to continue displaying frames of image data available in a buffer of the streaming client until the selected optimal frame of image data is encountered, and
the controller is adapted to display the selected optimal frame of image data as a still picture on the display of the streaming client, wherein
the controller is adapted to select the optimal frame of image data from among the decoded frames of image data by:
determining a set of consecutive frames of image data as candidate images among which to select the optimal frame of image data,
determining that no I-frame is available in the set of consecutive frames of image data,
calculating cepstrum of all frames of image data in the set of consecutive frames of image data,
selecting the frame of image data having maximum cepstrum as the optimal frame of image data.

11. A computer program product comprising a non-transitory computer readable medium storing a computer program for handling video streaming data, the computer program comprising computer program code which when run on a streaming client causes the streaming client to:
receive video streaming data transmitted by a video streaming server, the video streaming data comprising frames of image data,
decode and buffer the received frames of image data,
display the frames of image data on a display of the streaming client,
receive an input requesting a pause in the reception of video streaming data,
select, among decoded frames of image data, an optimal frame of image data, and
continue displaying frames of image data available in a buffer of the streaming client until the selected optimal frame of image data is encountered, and
display the selected optimal frame of image data as a still picture on the display of the streaming client, wherein the computer program causes the streaming client to select the optimal frame of image data by:
determining a set of consecutive frames of image data as candidate images among which to select the optimal decoded frame of image data,
determining that no I-frame is available in the set of consecutive frames of image data,
calculating cepstrum of all frames of image data in the set of consecutive frames of image data,
selecting the frame of image data having maximum cepstrum as the optimal frame of image data.

12. A method performed by a client apparatus comprising a display and a video frame buffer, the method comprising:
receiving, at the client apparatus, an encoded video frame;
decoding, by the client apparatus, the received encoded video frame, thereby producing a decoded video frame;
storing the decoded video frame in said video frame buffer;
receiving, at the client apparatus, a video pause command; and
as a consequence of receiving the video pause command, i) the client apparatus identifying an optimal decoded video frame from among an ordered set of decoded video frames stored in the video frame buffer and ii) after identifying the optimal decoded video frame, the client apparatus causing the identified optimal decoded video frame to be displayed on the display as a still image until a resume play command is received, wherein the step of identifying the optical decoded video frame comprises:
determining that no I-frame is available in the ordered set of decoded video frames of image data,
calculating cepstrum of all frames of image data in the ordered set of decoded video frames of image data,
selecting the frame of image data having maximum cepstrum as the optimal frame of image data.

13. The method of claim 12, wherein, after identifying the optimal video frame and prior to causing the display of the optimal video frame as a still image, the method further comprises sequentially displaying on said display each decoded video frame that precedes said optimal decoded video frame in said ordered set of decoded video frames.

* * * * *